Figure 1:
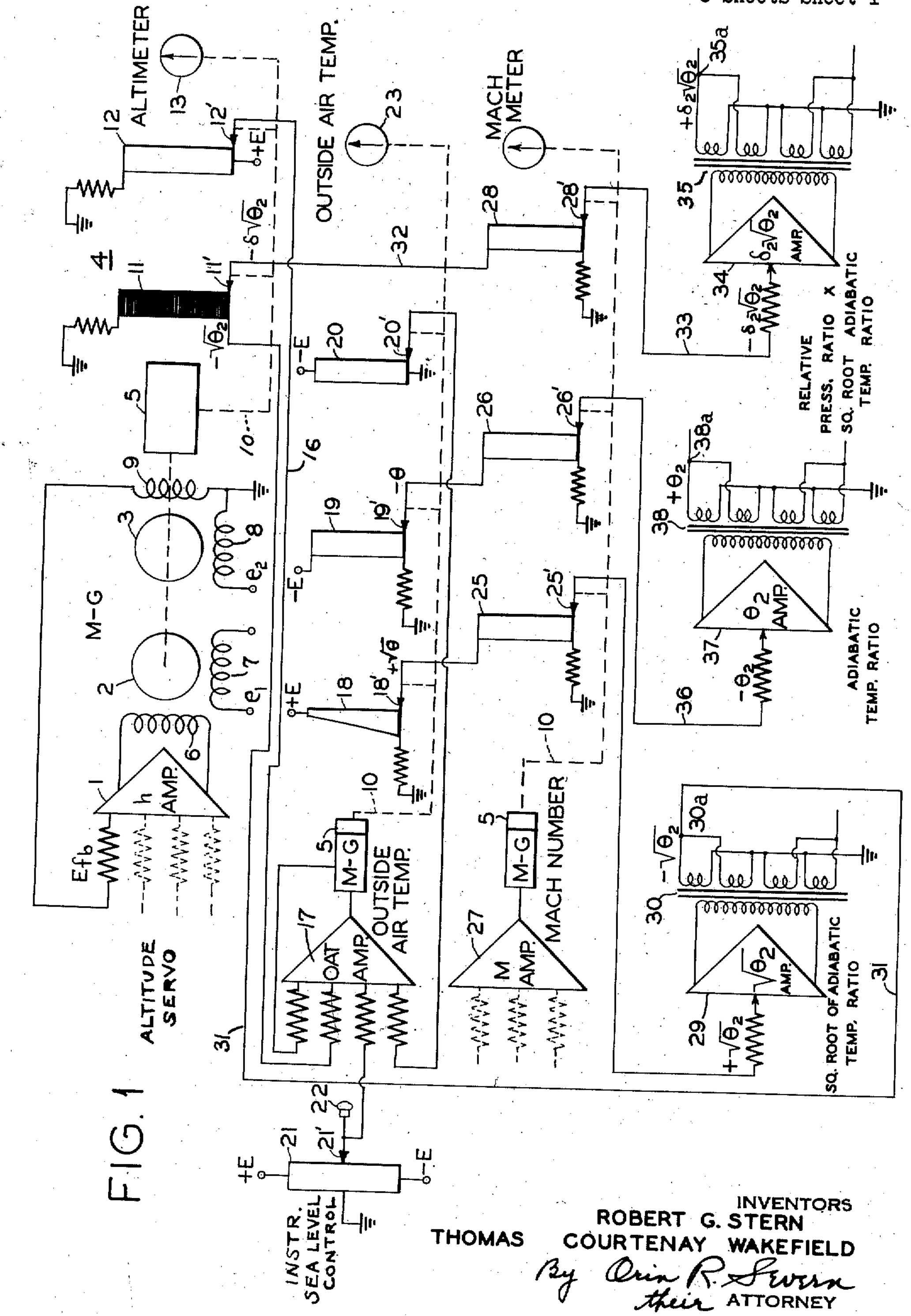

APPARATUS FOR SIMULATING AIRCRAFT TURBO-JET ENGINE OPERATION

Filed June 2, 1952 3 Sheets-Sheet 1

INVENTORS
ROBERT G. STERN
THOMAS COURTENAY WAKEFIELD
By Orin R. Severn
their ATTORNEY

APPARATUS FOR SIMULATING AIRCRAFT TURBO-JET ENGINE OPERATION

Filed June 2, 1952 3 Sheets-Sheet 2

INVENTORS
ROBERT G. STERN
THOMAS COURTENAY WAKEFIELD
By Orin R. Severn
their ATTORNEY APPARATUS FOR SIMULATING AIRCRAFT TURBO-JET ENGINE OPERATION
Filed June 2, 1952 3 Sheets-Sheet 3
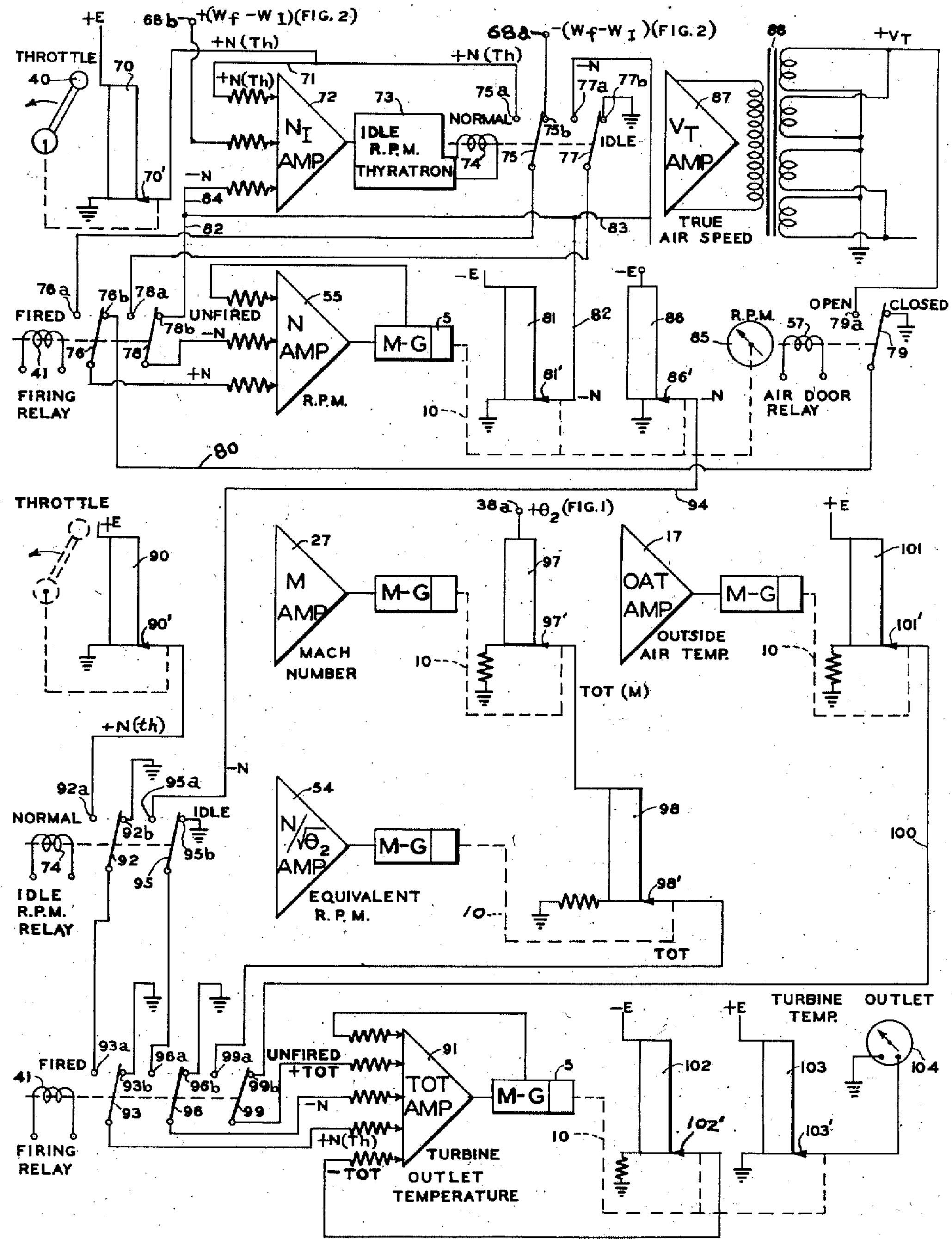
INVENTORS
ROBERT G. STERN
THOMAS COURTENAY WAKEFIELD
By Orin R. Severn
their ATTORNEY

United States Patent Office 2,798,308

Patented July 9, 1957

1

2,798,308

APPARATUS FOR SIMULATING AIRCRAFT TURBO-JET ENGINE OPERATION

Robert G. Stern, Caldwell, and Thomas Courtenay Wakefield, Denville, N. J., assignors to Curtiss-Wright Corporation, a corporation of Delaware

Application June 2, 1952, Serial No. 291,254

44 Claims. (Cl. 35—12)

This invention relates to apparatus for simulating important phases of operation of turbo-jet aircraft engines, especially where "Mach number" is an important factor in aircraft performance, and particularly to apparatus of this character useful in the ground training of aircraft personnel.

In accordance with the present invention certain basic parameters involved in turbo-jet engine operation are used in the design of analogue computing apparatus embodying the invention. The apparatus is responsive to the operation of a simulated throttle and other controls by the student pilot for simulating flight whereby certain phases of turbo-jet engine operation including fuel flow, turbine R. P. M. and turbine outlet (tail pipe) temperature are simulated.

As is well known, the tail pipe temperature is a very critical factor in gas turbine operation since it determines the life of the turbine, and therefore the functioning of the aircraft itself. For example, acceleration of the turbine by addition of fuel causes a material increase in tail pipe temperature that should be limited to brief duration; otherwise damage to the turbine might result. Other factors, such as altitude and Mach number also materially affect tail pipe temperature under given conditions of fuel flow. It is therefore highly important that jet pilots be given thorough ground training in the proper handling of jet engine controls for operating modern high speed jet aircraft.

A principal object of this invention therefore is to provide improved flight simulating and training apparatus for representing in a realistic manner important and critical phases of operation of a turbo-jet engine adapted for high speed aircraft.

A further object of this invention is to provide improved flight simulating and training apparatus for the ground training of aircraft personnel in efficient operation of turbo-jet aircraft engines and for representing and indicating important phases of turbo-jet engine operation including turbine R. P. M. and turbine tail pipe temperature, especially where Mach number is an important factor in performance.

The invention will be more fully set forth in the following description referring to the accompanying drawings and the features of novelty will be pointed out with particularity in the claims annexed to and forming a part of this specification.

Figure 2:
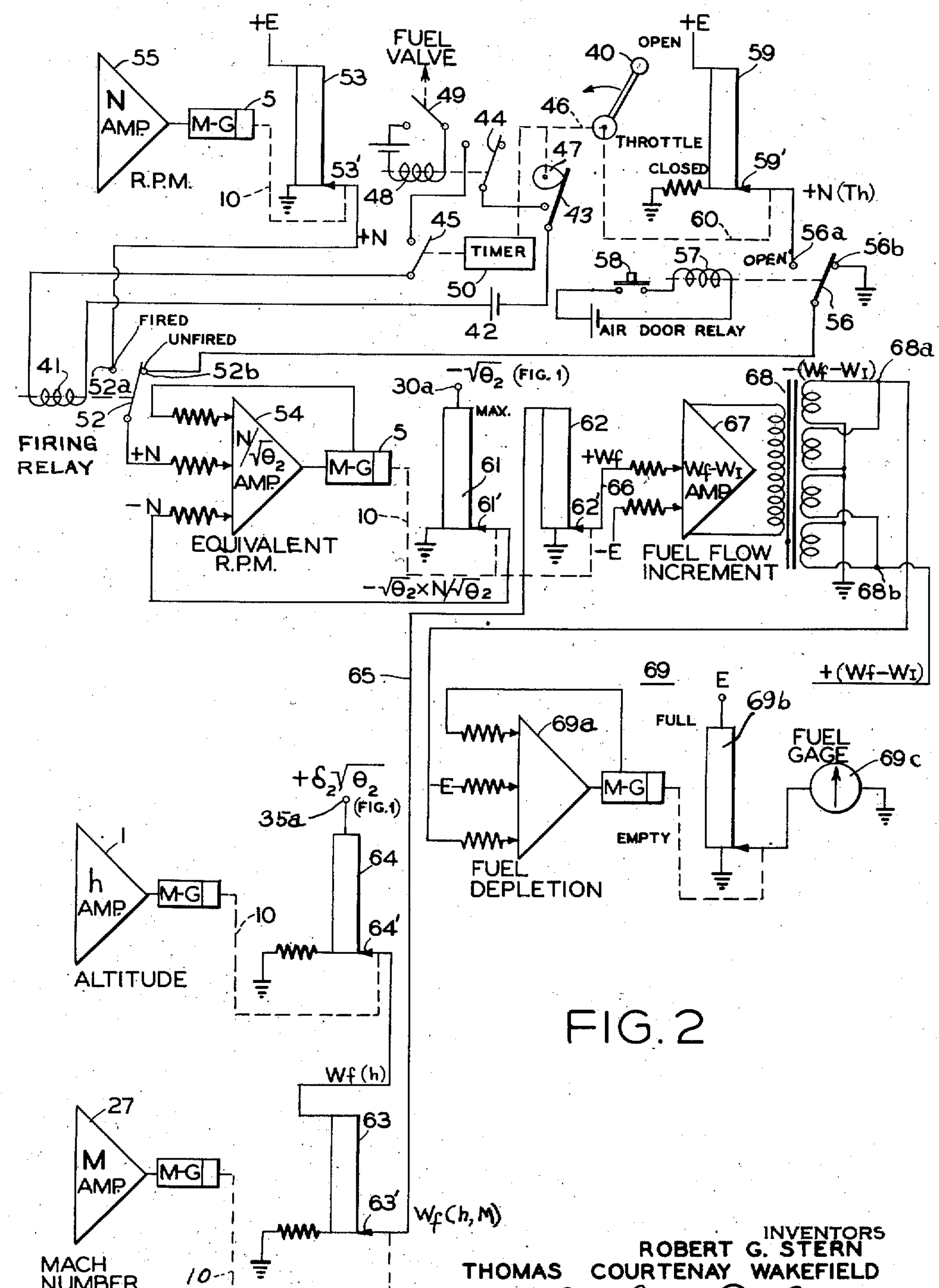

Referring to the drawings,

Fig. 1 is a partly diagrammatic and schematic illustration of a part of the simulating apparatus embodying the invention for determining temperature factors;

Fig. 2 is a similar illustration of another part of the simulating and computing apparatus for determining equivalent R. P. M. and fuel flow increment in the simulated turbine operation; and Fig. 3 is a similar illustration of other parts of the simulating and computing apparatus for determining turbine R. P. M. and tail pipe temperature, all in cooperation with the computing apparatus of Figs. 1 and 2.

It is not necessary for the purposes of the present invention to analyze the theory underlying turbo-jet engine design other than to indicate certain basic parameters and to illustrate means for utilizing these parameters in the simulating apparatus embodying the present invention.

In high speed aircraft of the trans-sonic type, Mach number (M) is a very important factor affecting both airplane and engine performance. This factor is the numerical ratio of the instantaneous speed of the aircraft to the speed of sound at the temperature of the surrounding air. The basic parameters used in the present computing system are as follows:

$\theta_2$—Adiabatic temperature ratio incident to relative motion of air and plane $\sqrt{\theta_2}$—Square root of the adiabatic temperature ratio $\delta_2\sqrt{\theta_2}$—Relative pressure ratio (ram/ambient) × square root of adiabatic temperature ratio The adiabatic temperature ratio $\theta_2$ can be expressed by the following functions:

$$\theta_2=\frac{Tam}{Tsl}\frac{(\gamma-1)}{2}M^2+1=\frac{Tam}{Tsl}\times f(M)$$

where $Tam$=ambient air temperature $Tsl$=standard sea level air temperature $M$=Mach number $\gamma$=specific heat ratio In accordance with the invention the formula above including a function of Mach number $f$(M) is used for simulating purposes and the term $f$(M) is determined from test data of the particular aircraft that is simulated.

In the computing system of the invention certain basic flight conditions including altitude ($h$), true airspeed ($V_T$) and Mach number (M) are represented schematically by servo units, the control circuits of which are disclosed in copending applications identified below and therefore are omitted in order to avoid unnecessary complication of the application. The servo units representing altitude and true airspeed are disclosed in Patent No. 2,731,737, granted January 24, 1956, to Robert G. Stern, one of the present applicants, for "Aircraft Training Apparatus for Simulating Landing and Related Maneuvers"; and a servo unit representing Mach number is disclosed in a co-pending application S. N. 291,253, "Apparatus for Simulating Flight Conditions of High Speed Aircraft," filed concurrently herewith by the present applicants, both applications being assigned to the same assignee as the present invention.

Referring to Fig. 1, the altitude servo system will be first described as it is typical of the servo systems incorporated in the computing system of the present invention. In general, the servo system which is of the integrating type comprises a servo amplifier 1 to which are applied a number of control voltages representing respectively components of vertical airspeed as described in the aforesaid Patent No. 2,731,737. A motor 2 is responsive to the amplifier output for driving a feed-back generator 3 and a potentiometer group 4 that is operatively connected through a reduction gear box 5 to the motor-generator. The altitude servo amplifier 1 is a summing amplifier for determining the resultant of the respective input voltages representing components of vertical airspeed.

Such amplifiers are well known in the art for algebraically summing a plurality of separate A. C. voltages of varying magnitude and polarity, and a detailed circuit illustration is therefore unnecessary. The output of the amplifier 1 is used to control a servo network including a motor-generator set diagrammatically indicated in other parts of the drawings as M-G.

The circuit connections thereof are specifically shown in the altitude or $h$ servo of Fig. 1 and since the M-G operation is essentially the same for the other servos, a single illustration is sufficient. The motor 2 is of the two-phase type, the control phase 6 of which is energized by the amplifier output as illustrated and the other phase 7 by a constant reference A. C. voltage $e_1$ dephased 90° from the control voltage. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feedback generator 3 also having one phase 8 energized by a 90° dephased A. C. reference voltage $e_2$, the other phase 9 generating according to the motor speed a velocity feed-back voltage $E_{fb}$ for purposes of speed control. The feed-back voltage $E_{fb}$ in the altitude servo system represents $$\frac{dh}{dt}$$

i. e., vertical velocity, and is an input for the amplifier 1. The motor also serves to gang-operate through a gear reduction train 5 and suitable mechanical connections indicated by dotted lines 10 the contacts of a potentiometer system and also in certain servo systems an appropriate indicating instrument.

The individual potentiometer resistance elements, such as the units 11 and 12 of the altitude servo system may be of the well-known wound card type and are of circular or band form in practice but are diagrammatically illustrated in a plane development for clearness. A structural arrangement that may be conveniently used for a servo motor and potentiometer combination of the character above referred to is shown by Patent No. 2,431,749, issued December 2, 1947, to R. B. Grant for "Potentiometer Housing and Positioning Structure."

It will therefore be apparent that operation of the altitude servomotor in either direction causes the gang-operated potentiometer slider contacts 11' and 12' to move to corresponding angular positions on the respective potentiometer elements for deriving, i. e. selecting or picking off, potentiometer voltages dependent on the respective contact position. Each potentiometer of each servo system is shaped or contoured so that the value of the derived voltage at the potentiometer contact bears a certain relationship to the linear movement of the slider contact depending on the particular function of the potentiometer, and has a voltage impressed across its terminals depending as to instantaneous polarity and magnitude also on the function of the potentiometer. In the present case the contour of all functional potentiometers represents the derivative of the function represented. For example, the potentiometers of the altitude system are for practical purposes of the linear type to represent a relationship $x=y$, where $x$ represents the linear movement of the contact and $y$ represents the derived potentiometer voltage. Stated more specifically, the contour or width variation and therefore the resistance distribution of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position.

The slope of the function curve then is the constant ratio of derived voltage to increase in the independent variable represented by the contact travel from the zero position. The derivative of this relationship is the same for all contact settings so that the width of the card in this case is uniform, making it rectangular in shape. Thus the width of the card at any given contact position is determined by the linear or non-linear character of the function.

In respect to the altitude servo, it will be apparent that the integration of vertical airspeed is altitude. Accordingly, an indicator 13 connected to the motor output through the gear box 5 and connection 10 can be calibrated in terms of altitude to represent an altimeter.

The altitude potentiometer 12 is energized at its lower terminal as indicated by an alternating current voltage +E and is grounded at its upper terminal through a resistance for representing the decrease of ambient air temperature with increase in altitude. As the simulated altitude increases, the slider contact 12' moves toward the upper terminal with the result that the derived voltage at the slider contact decreases to represent lower air temperature. This derived voltage is directed by conductor 16 to the input side of a summing amplifier 17 representing outside air temperature (OAT). This amplifier controls generally in the same manner as the altitude system a plurality of potentiometers or cards 18, 19 and 20 respectively through a motor-generator set as indicated. The inputs to the OAT amplifier 17 include the derived temperature voltage from the altitude potentiometer 12, a reference voltage that is derived from a potentiometer 21 for representing a standard sea level air temperature and a "position" voltage that is derived at the slider 20' of the "answer" potentiometer 20.

The slider 21' of the reference potentiometer is adjustable manually at 22 by an instructor for establishing the reference sea level air temperature. As illustrated, the potentiometer 21 is provided with a grounded center tap and is energized at its opposite terminals by A. C. voltages of opposite instant polarity +E and −E respectively for simulating temperature variation above or below a given datum. The derived voltages from the altitude card 12 and the OAT answer card 20 are of opposite instant polarity for balancing and de-energizing the OAT servomotor when the answer voltage is equal to the resultant of the other inputs. This position of the slider contact 20' of the answer card represents outside air temperature and therefore an indicator 23 calibrated in terms of temperature may be driven from the servomotor as indicated to represent an OAT Indicator.

The temperature factor voltages are derived for computing purposes in the following manner:

The function voltage representing $\theta_2$ (adiabatic temperature ratio) is jointly derived from two series-connected potentiometers, one in the OAT servo for representing the temperature ratio, and the other in the Mach number servo for representing $f(M)$. The finally derived voltage thus represents the adiabatic temperature ratio, $\theta_2$. A second function voltage representing the square root of the adiabatic temperature ratio, $\sqrt{\theta_2}$, is derived in similar manner to $\theta_2$ except that the OAT card in question is designed for deriving a square root function. This last voltage is also used in combination with a relative pressure ratio factor $\delta_2$ for producing a third function voltage $\delta_2\sqrt{\theta_2}$.

The relative pressure ratio ($\delta_2$) is the ratio of the compressor inlet or ram pressure to standard sea level air pressure and may be expressed by the equation:

$$\delta_2=\frac{Pin}{Psl}=pam+k\rho V^2{}_T/2$$

where $Pin$=compressor inlet pressure
$Pam$=ambient air pressure
$Psl$=standard sea level air pressure
$k$=value determined by installation
$\rho$=air density
$V_T$=true airspeed Since the factors in this equation can all be expressed in terms of altitude, Mach number and a constant, the factor $\delta_2\sqrt{\theta_2}$ can be determined by deriving a voltage from two series-connected potentiometers energized by a voltage representing $\sqrt{\theta_2}$ and adjustable according to altitude and Mach number respectively.

Specifically, the OAT cards 18 and 19 are energized by constant A. C. voltages +E and −E of opposite instant polarity respectively, and are designed for deriving temperature factor voltages according to variations in outside air temperature for in turn energizing the potentiometers 25 and 26 of the Mach number servo system. The control circuits for the input voltages for the Mach number servo amplifier 27 are disclosed in the aforesaid Stern et al. application, it being sufficient to state that the servomotor positions the potentiometer sliders 25', 26' and 28' through mechanism previously described to represent variations in Mach number. The Mach card 28 is energized from card 11 of the altitude system for deriving the pressure ratio-temperature factor voltages $\delta_2\sqrt{\theta_2}$ as hereinafter described.

Referring now to the OAT card 18, this card is designed for deriving a square root function, namely $\sqrt{\theta}$, where $\theta$ represents a function of OAT. The derived voltage from slider 18' energizes the M card 25 so that the derived voltage from this card at slider 25' represents $\sqrt{\theta_2}$, namely the square root of the adiabatic temperature ratio. This voltage $+\sqrt{\theta_2}$ is fed to a line amplifier 29 the output of which energizes a transformer 30 for producing at its secondary, terminal **30*a*, a control voltage of opposite polarity $-\sqrt{\theta_2}$, that is fed by conductor 31 to the altitude card 11 for energizing the lower terminal thereof as indicated. The upper terminal is grounded through a suitable resistance. Accordingly, the voltage derived at the slider 11'** of this card can represent an intermediate factor $\delta_2\sqrt{\theta_2}$.

This voltage is fed by conductor 32 to M card 28 so that the derived voltage from this card at slider 28' may represent a factor $-\delta_2\sqrt{\theta_2}$, namely, the relative pressure ratio multiplied by the square root of the adiabatic temperature ratio. This derived voltage is fed by conductor 33 to line amplifier 34, the output of which energizes a transformer 35 for producing at its secondary winding, terminal **35*a***, a control voltage $+\delta_2\sqrt{\theta_2}$.

A further temperature factor $\theta_2$ representing the adiabatic temperature ratio is derived from M card 26 which is in turn energized by a voltage $-\theta$ derived at slider 19' of the OAT card 19. The voltage derived at slider 26' of M card 26 represents $-\theta_2$ and is fed by conductor 36 to the line amplifier 37, the output of which is connected to a transformer 38 for producing at its secondary winding, terminal **38*a***, the control voltage $+\theta_2$.

Referring now to Fig. 2, there is shown additional computing apparatus for determining the fuel flow increment representing the difference between the total fuel flow ($W_f$) and the idle R. P. M. fuel flow ($W_i$). In this computation a special operator is used termed "equivalent R. P. M." and representing $N/\sqrt{\theta_2}$, where N equals the actual turbine R. P. M. The equivalent R. P. M. servo presently described is used to determine most of the jet turbine characteristics It is a function of R. P. M. and the square root of the adiabatic temperature ratio when the jet engine is fired, and is a function of the throttle position when the jet engine is not fired, assuming that the air doors i. e. the vanes for controlling admission of air to the turbine compressor are open. Thus the equivalent R. P. M. is primarily an operator for determining simulated fuel flow when the engine is either fired or not fired.

The fuel flow for a turbo-jet turbine is a function of altitude, Mach number and turbine R. P. M. The R. P. M. function for this computation is determined as hereinafter described by means of the equivalent R. P. M. servo. The factor $\delta_2\sqrt{\theta_2}$ is used to bring the variations of the above functions to a common basis. A voltage representing this factor is impressed on an altitude card which is connected in series with a Mach number card and also an equivalent R. P. M. card. The finally derived voltage from the equivalent R. P. M. card represents total fuel flow ($W_f$) and the difference between this voltage and a constant voltage representing idle R. P. M. fuel flow ($W_i$) represents in turn the "fuel flow increment" ($W_f - W_i$).

Referring specifically to the circuits of Fig. 2, a simulated throttle control 40 is operatively related to a "firing" relay 41 which represents a fired or unfired condition of the jet engine. The relay is adapted to be energized from a D. C. source 42 through a plurality of series-connected switches 43, 44 and 45 so that all switches must be closed in order to energize the relay for representing the "fired" condition. The switch 43 is controlled according to the position of the throttle through a suitable connection 46 and cam 47 so that the switch is open when the throttle is closed, and vice versa. The switch 44 is controlled by a relay 48 that is adapted to be energized as indicated by a switch 49 that is operated by the pilot according to positioning of the simulated fuel valve (not shown). When the fuel valve is represented as closed the relay 48 is deenergized and the switch 44 is open. The switch 45 is simply for simulating time delay in firing the engine and is adapted to be closed by a timer 50 that is suitably controlled by the throttle through the indicated connection 46.

When the throttle is opened the timer is actuated causing delayed operation of the switch 45.

The relay 41 controls a switch 52 for selecting a voltage for the equivalent R. P. M. servo according to the operating condition of the jet engine. In the fired condition, the switch 52 makes contact at **52*a* for connecting the slider 53' of R. P. M. card 53 to the input side of the equivalent R. P. M. servo amplifier 54. The voltage derived from card 53 which is energized as indicated by a constant A. C. voltage +E, represents turbine R. P. M. The R. P. M. servo amplifier 55 for controlling the servomotor and slider 53'** is energized as hereinafter described by means of circuits shown in Fig. 3.

When the jet engine is represented as not fired, the firing relay 41 is deenergized as shown and the switch 52 connects the amplifier 54 through contact **52*b* to a switch 56 controlled by the "air door" relay 57. This relay can be energized as indicated through a switch 58 under control of the student pilot. With the air door relay deenergized as shown the switch 56 completes a connection at contact 56*b* to ground so that the input at amplifier 54 is zero. When the air doors are "open" the switch 56 engages contact 56*a* and connects the amplifier to the slider 59' of a potentiometer 59 that is adjustable by the throttle 40 through a connection 60. The card 59 is energized by a constant A. C. voltage +E and the derived voltage at the slider 59'** is assumed to represent R. P. M. for computing fuel flow as hereinafter described.

Accordingly, it will be noted that the equivalent R. P. M. servo amplifier 54 is provided with an input voltage representing R. P. M. in either the "fired" or "unfired" condition of the turbine, provided the air doors in the latter case are "open." The equivalent R. P. M. servo includes an answer potentiometer 61, the slider 61' of which derives an input answer voltage for the amplifier 54. The card 61 is energized at terminal **30*a*** by a voltage $-\sqrt{\theta_2}$, Fig. 1, so that the answer input is opposite in polarity to that from the firing relay switch. Therefore the servo reaches a balance when the slider position corresponds to "equivalent R. P. M."

A second potentiometer 62 is also controlled by this servo and is energized by a voltage from a Mach number potentiometer 63, the latter in turn being energized by a voltage from an altitude potentiometer 64.

The altitude card, terminal 35a, is in turn energized by a voltage $+\delta_2\sqrt{\theta_2}$, Fig. 1, so that the derived voltage at slider 64' represents a fuel flow factor as modified by altitude. This voltage is further modified by the Mach number card 63 and the derived voltage at slider 63' on conductor 65 is further modified by the equivalent R. P. M. card 62 so that the derived voltage at slider 62' may represent total fuel flow $W_f$. This voltage is fed by conductor 66 to the input side of the fuel flow increment amplifier 67. A constant A. C. voltage −E of opposite polarity representing "idle R. P. M." fuel flow also is an amplifier input. Accordingly, the resultant output of the amplifier represents the "fuel flow increment" $(W_f-W_i)$. This output voltage is fed to a transformer 68, the secondary winding of which is arranged to produce at the terminals 68a and 68b voltages of opposite polarity representing fuel flow increment.

For indicating fuel depletion an integrating servo system 69 may be controlled by a voltage representing fuel flow. As shown, the amplifier 69a is energized by the aforesaid increment voltage from the transformer terminal 68a and the constant idle R. P. M. voltage −E. The resultant fuel flow voltage controls the servomotor and potentiometer 69b which in turn derives a voltage for controlling the fuel gage indicator 69c. Normally, the fuel gage servo operates in response to the negative voltage from the transformer terminal 68a in a direction to run the gage gradually toward zero for indicating fuel reserve. However, when the turbine is shut down, i. e., the firing relay is "unfired" and the air door relay "closed," the input +N for the "equivalent R. P. M." amplifier 54 is grounded so that the answer voltage from card 61 runs the servo to zero. Therefore the derived voltage from card 62 is zero so that the total input for the amplifier 67 is now −E representing idle fuel flow. The resulting output voltage of the transformer at terminal 68a now becomes +E which balances the constant voltage input −E for the gage servo amplifier 69a, thereby deenergizing the servo and stopping the gage needle.

The circuits for controlling the R. P. M. servo and also for representing "idle R. P. M." are shown in Fig. 3. In actual operation, jet turbine R. P. M. is a direct function of throttle position unless the fuel required for a given R. P. M. is less than the idle R. P. M. fuel flow ($W_i$). At this point, the turbine R. P. M. becomes a function of idle R. P. M. For simulating this operation, a thyratron for representing idle R. P. M. is controlled basically by an input voltage representing the fuel flow increment $(W_f-W_i)$. When the fuel flow $W_f$ becomes less than the idle R. P. M. fuel flow ($W_i$) the function voltage becomes negative and shuts off the thyratron to indicate the idle position. The other thyratron input voltages representing throttle position and R. P. M. remain equal for normal operation and since these voltages are of opposite polarity the resultant is zero in such case. During "acceleration" the throttle input will be greater than the R. P. M. input by reason of the inherent lag in the servo system, and since the throttle input is positive the thyratron will be maintained in the fired or normal condition. During "deceleration" the negative R. P. M. input will be greater than the throttle input and the resultant negative voltage will shut off the thyratron before the fuel flow has dropped below idle R. P. M. fuel flow. This operation aids in damping the R. P. M. deceleration and prevents the R. P. M. undershooting the idle R. P. M.

When the engine is not fired the idle R. P. M. thyratron does not affect the R. P. M. system. In that case the R. P. M. will be a direct function of true airspeed $V_T$ thus representing the "wind milling R. P. M.," provided the "air doors" are open. When the engine is fired the R. P. M. will be controlled through the idle R. P. M. thyratron. In its normal operation the throttle directly controls the R. P. M. servo with the R. P. M. answer voltage being controlled by the idle thyratron relay.

When the idle R. P. M. thyratron is shut off to represent the idle position, the input to the R. P. M. servo represents the fuel flow increment with the R. P. M. answer voltage grounded out. Thus the R. P. M. servo will balance at a position where the fuel flow increment is zero, i. e. where $W_f=W_i$.

Referring specifically to Fig. 3, the throttle 40 is connected to the slider 70' of a potentiometer 70 that is energized by a constant A. C. voltage +E for deriving a voltage +N(th) corresponding to R. P. M. as a function of throttle position. This derived voltage is fed by conductor 71 to the input side of an amplifier 72 representing idle R. P. M. ($N_i$) of the turbine. The other amplifier inputs include as indicated a fuel flow increment voltage at terminal 68b from the secondary of the transformer 68, Fig. 2, and a balancing voltage −N from the R. P. M. servo presently described. The resultant output voltage from the amplifier 72 controls the idle R. P. M. thyratron 73. When the thyratron is fired it is adapted to energize a relay 74 for operating a plurality of switches between positions representing "normal" and "idle" conditions of the turbine respectively. One switch 75 is adapted selectively to connect the R. P. M. throttle voltage +N(th) at contact 75a or a negative fuel flow increment voltage $-(W_f-W_i)$ at contact 75b through a switch 76 (contact 76a) of the firing relay 41 to the input side of the R. P. M. servo amplifier 55 when the turbine is represented as "fired." Another switch 77 under control of the idle R. P. M. thyratron relay is adapted selectively to connect a voltage −N at contact 77a from the R. P. M. servo or to make at 77b a ground connection to the input of amplifier 55 through the firing relay switch 78 (contact 78a) when the turbine is fired.

In the unfired condition of the turbine, a true airspeed voltage $+V_T$ is fed from the $V_T$ amplifier 87 and transformer 88 through contact 79a, switch 79 (where the air doors are open), conductor 80, contact 76b, switch 76, to the R. P. M. amplifier 55; and a balancing voltage −N from the R. P. M. servo is fed through contact 78b, firing relay switch 78, to the amplifier. The balancing or answer voltage −N above referred to is derived at slider 81' of the R. P. M. card 81 that is energized by a constant A. C. voltage −E. This derived voltage which has several functions as above described is fed by conductor 82 to the firing relay switch 78; by conductors 82 and 83 to the idle R. P. M. thyratron relay switch 77; and by conductors 82 and 84 to the input side of the idle R. P. M. amplifier 72.

Accordingly, it will be seen that with the turbine running "normal" and "fired" the control voltage for the R. P. M. servo is fed directly from the throttle potentiometer 70, the other input voltage being simply the answer voltage −N from the R. P. M. answer card 81. With the turbine running "idle" and "fired," the sole input for the R. P. M. servo is from the fuel flow increment amplifier, Fig. 2. The other input connection is grounded by idle R. P. M. switch 77 so that input voltage is zero. In this condition, the magnitude and polarity of the voltages representing $W_f$ and $W_i$ determine the operation of the R. P. M., i. e., N servo as previously described. For example, where idle fuel flow is represented, the $(W_f-W_i)$ computer controls the N servo which in combination with adiabatic temperature factor $\sqrt{\theta_2}$ controls the $N/\sqrt{\theta_2}$ servo, which in combination with other factors controls the $(W_f-W_i)$ computer, thereby completing the control loop. Thus, since $W_f$ and $W_i$ are equal for idle fuel flow, the resultant $(W_f-W_i)$ is zero and the N servo is stabilized for this condition with zero input. Further control of the N servo at idle fuel flow through the $N/\sqrt{\theta_2}$ servo and $(W_f-W_i)$ computer is responsive also to variation of the factors $\delta$ and $\theta_2$ (which determine $W_f$) under varying simulated ambient and flight conditions.

When the turbine is represented as "unfired" and the air doors are "open," a voltage representing true airspeed $+V_t$ is impressed on the R. P. M. amplifier 55 tending to increase the R. P. M. in simulation of "wind milling"

of the turbine. The idle R. P. M. thyratron in this instant would be shut off by the predominant negative wind milling R. P. M. voltage −N to throw the switches 75 and 77 to "idle," assuming the throttle is retarded. The idle R. P. M. thyratron switches 75 and 77 are cut out by the firing relay switches 76 and 78 so that simply an answer voltage −N is impressed on the R. P. M. amplifier for balancing the windmilling voltage. If the throttle is advanced for simulating re-starting the engine in flight, the thyratron is started and the switches 75 and 77 operated to "normal." It will be noted that where the engine is "unfired" and the air doors "open," fuel indication is switched from R. P. M. control to throttle control.

If simulated shutting down an engine in flight is desired, the throttle is closed thereby deenergizing the firing relay, and the air door relay switch is operated to "closed" position, thereby grounding out the R. P. M. servo input and causing the answer voltage from card 81 to run the servo to the zero R. P. M. position as in the case of the "equivalent R. P. M." servo previously described.

The R. P. M. servo is arranged to operate a turbine R. P. M. indicator 85 from the servomotor, and also for controlling a potentiometer 86 that is energized by a constant A. C. voltage −E for deriving at the slider 86′ an R. P. M. voltage −N for controlling circuits of the computing apparatus relating to turbine outlet temperature as hereinafter described. Thus the inherent inertia and time lag of the servo causes the indicator 85 to represent realistically the characteristic R. P. M. lag in response to throttle operation.

In jet turbine operation the turbine outlet or tail pipe temperature is a very critical factor and the life of the turbine is dependent on maintaining the tail pipe temperature within a proper range. During changes in turbine speed settings this temperature exceeds the static or no-change condition temperature. Thus the speed with which throttle change can be made is usually dependent on the degree of rise of tail pipe temperature above the static condition temperature. The TOT system shown in Fig. 3 is adapted to simulate these transient increases in tail pipe temperature.

The turbine outlet or tail pipe temperature (TOT) is represented by the TOT gauge. This gauge reads outside air temperature OAT when the turbine is not fired and the tail pipe temperature when the turbine is fired. The turbine outlet temperature is a function of Mach number, turbine R. P. M. and outside air temperature. In the jet engine simulating circuits of one embodiment of the present invention this is determined by impressing a voltage representing adiabatic temperature ratio $\theta_2$ on a Mach number servo potentiometer which is in series with an equivalent R. P. M. servo potentiometer. In simulating transient changes, a throttle input voltage and R. P. M. input voltage are provided for the TOT servo each through the firing relay and the idle R. P. M. thyratron relay. These input voltages are equal in the static condition but of opposite polarity, the throttle voltage being positive so that it tends to produce a higher temperature indication and the R. P. M. voltage being negative for balancing the throttle input. However, during "acceleration," i. e. further opening of the throttle, the rise in tail pipe temperature will be a function of the difference between the throttle position and the turbine R. P. M. indication. Since the rate of change of the R. P. M. servo operation may be made equivalent by suitable circuit and mechanical design, including for example, the use of a flywheel on the R. P. M. servomotor, to that of the jet turbine that is simulated, the characteristics of the turbine outlet temperature surge of the jet turbine may be simulated by the present invention.

The aforesaid throttle and R. P. M. input voltages are used, as above described, to control the operation of the idle R. P. M. thyratron so as to prevent occurrence of unwanted effects during idle R. P. M. and deceleration conditions. By reason of the idle R. P. M. characteristics of the jet turbine there are conditions where the throttle position does not agree with the turbine R. P. M. indication. These conditions occur at high altitude when the throttle is set at a low R. P. M. position which represents less fuel than for idle R. P. M. Under this condition the throttle and R. P. M. inputs at the TOT servo are not equal so that the idle R. P. M. thyratron functions to cut out both inputs thus using the sole TOT input from switch 99 and avoiding a negative input for the TOT servo. Similarly during deceleration when the throttle input voltage is much smaller than the R. P. M. input voltage, the idle thyratron shuts off and cuts out both inputs thereby preventing an excessively low and unrealistic TOT indication.

Referring again to Fig. 3, the throttle 40 is connected to the slider 90′ of a throttle potentiometer 90 that is energized by a constant A. C. voltage +E so that the derived voltage represents +N(th). This voltage is fed to the input side of the TOT servo amplifier 91 through the idle relay switch 92, contact **92*a* and firing relay switch 93, contact 93*a*, assuming both "normal" and "fired" conditions. The negative R. P. M. voltage input −N is derived at slider 86′ of the R. P. M. card 86 and is fed to the input side of TOT amplifier 91 through conductor 94, idle relay switch 95 at contact 95*a*, and firing relay switch 96 at contact 96*a*, again assuming "normal" and "fired" conditions of the turbine. In the event that the turbine is "unfired," the aforesaid input connections are grounded at the contacts 93*b* and 96*b* respectively of the firing relay switches 93 and 96. In the event that the turbine is "fired" and operating at idle R. P. M., these same input connections are grounded through contacts 92*b* and 95*b* respectively of the idle relay switches 92 and 95**.

The main TOT input voltage for the TOT amplifier 91 is jointly derived from the series-connected Mach number servo potentiometer 97 and the equivalent R. P. M. potentiometer 98. The Mach number card 97 is energized at terminal **38*a* by the adiabatic temperature ratio voltage $+\theta_2$, Fig. 1, and the derived voltage at slider 97′ energizes the equivalent R. P. M. card 98, the slider 98′ of which is connected to the firing relay switch 99, contact 99*a*. Thus a voltage representating the turbine outlet temperature is connected through switch 99 to the input side of the TOT amplifier 91 when the turbine is represented as fired. When the turbine is represented as unfired, the switch 99 through contact 99*b* connects the input side of amplifier 91 to conductor 100 and slider 101′ of the outside air temperature potentiometer 101. This card is energized by a constant A. C. voltage +E so that in the unfired condition a voltage representing outside air temperature constitutes the main input to the TOT amplifier. The TOT servo is of the self-balancing type and accordingly is provided with an answer potentiometer 102 energized by a constant negative A. C. voltage −E so that the derived voltage at slider 102′ balances the resultant of the other inputs when the servo reaches the equilibrium position representing the turbine outlet temperature. The TOT servo may be provided with an additional potentiometer 103 for deriving a voltage at slider 103′ connected as indicated to energize an electric meter 104 calibrated to indicate degrees of tail pipe temperature; or the indicator 104 can be driven directly through the connection 10** from the servomotor.

The indicator 104 is controlled through the "idle R. P. M." relay so as to prevent unrealistic drop in TOT indication when the throttle is retarded faster than the engine R. P. M. servo decelerates. The decreased voltage +N(th) allows the lagging R. P. M. servo voltage −N temporarily to dominate for cutting out the thyratron and dropping the relay 74 to "idle" position. This in turn cuts out the pair of throttle and R. P. M. inputs to the TOT amplifier 91 so that the main input is now the computed TOT voltage. For acceleration, the relay 74 is on "normal" so that the TOT indicator shows a temporary increase as in practice when the throttle is opened and the turbine R. P. M. increases until it compensates for the added fuel.

The turbo-jet simulating system disclosed herein is simplified in the interest of clarity and a number of secondary circuits and refinements used in actual equipment are intentionally omitted. It will therefore be understood that the invention is intended to comprehend the use of conventional means and circuits for the disclosed system that do not affect the basic operation thereof, such as conventional interlocks for control switches, additional servo potentiometers for introducing refinements, etc.; also the term "relay" as used in this specification is intended to comprehend suitable means that carry out well-known relay functions in relaying, switching and controlling signals such as electric currents and voltages.

Therefore it should be understood that this invention is not limited to specific details of construction and arrangement thereof herein illustrated, and that changes and modifications may occur to one skilled in the art without departing from the spirit of the invention.

What is claimed is:

1. Apparatus for simulating the operation of a turbo-jet engine for high speed aircraft comprising a simulated throttle control operable by the pilot, means responsive to operation of said throttle control for deriving a control signal, a plurality of other control signal deriving means operable respectively according to simulated flight and ambient conditions represented as functions of air speed and ambient air temperature adapted jointly to produce control signals representing functions of the adiabatic temperature ratio incident to relative motion of air and aircraft, and computing means responsive jointly to derived throttle and adiabatic temperature ratio function signals for producing in turn a control signal representing turbine outlet temperature, and means responsive to said last-named control signal for indicating turbine outlet temperature.

2. Apparatus for simulating the operation of a turbo-jet engine for high speed aircraft comprising a simulated throttle control and means responsive thereto for deriving a control quantity representing a function of R. P. M., a plurality of electrical systems operable respectively according to functions of simulated altitude and Mach number for jointly producing control quantities representing adiabatic temperature functions including a pressure-temperature function, and computing means for combining said R. P. M. function quantity and said adiabatic and pressure-temperature function quantities for controlling indicating means representing turbine outlet temperature.

3. Apparatus for simulating the operation of a turbo-jet engine for high speed aircraft comprising a simulated throttle control operable by the pilot, means responsive to operation of said throttle control for deriving signal potential, a plurality of other signal potential deriving means operable respectively according to simulated flight and ambient conditions represented as functions of air speed and ambient air temperature and density adapted jointly to produce control potentials representing functions of the adiabatic temperature ratio incident to relative motion of air and aircraft and the relative ram to ambient pressure ratio, an electrical computing means responsive jointly to derived throttle and adiabatic temperature and pressure ratios function potentials for producing in turn a control potential representing turbine outlet temperature, and means responsive to said control potential for indicating turbine outlet temperature.

4. Apparatus for simulating the characteristic temperature response of a turbine-type engine for high speed aircraft comprising a simulated throttle control operable by the pilot, electrical means responsive to operation of said throttle control for producing control potential, means operable according to simulated flight and ambient atmospheric conditions for producing potential representing functions of $\theta_2$ (where $\theta_2$ represents an adiabatic temperature ratio incident to relative motion of the air and airplane), an electrical computing system controlled according to the aforesaid control and $\theta_2$ function potentials for in turn producing potential representing turbine outlet temperature, an electrical system responsive to said temperature potential for indicating turbine outlet temperature, and means for deriving a pair of potentials representing respectively a new advanced throttle position and a function of the instant turbine R. P. M., said electrical system also being responsive to the difference between said potentials to represent acceleration effect on turbine outlet temperature.

5. Apparatus for simulating temperature response characteristics of a turbine-type engine for high speed aircraft comprising a simulated throttle control, electrical means responsive to the operation of said throttle control for deriving control potential, an electric servo system adapted to lag said electrical means and responsive to said control potential for deriving potential corresponding to a function of turbine R. P. M., a computing system including said servo system for producing potential representing turbine outlet temperature, an electrical summing system jointly responsive to said temperature potential and to derive potential from both said electrical deriving means and said servo system for producing a resultant potential representing instant temperature response, and turbine outlet temperature indicating means operable according to said resultant potential whereby simulated acceleration temperature is represented at said indicating means in accordance with rapid advance of the throttle.

6. Apparatus for simulating temperature response characteristics of a turbine-type engine for high speed aircraft comprising a simulated throttle control, electrical means responsive to the operation of said throttle control for deriving control potential, a second electrical means responsive to said control potential for in turn deriving potential corresponding to a function of turbine R. P. M., said second electrical means adapted to follow said first-named means in time lag relation, a computing system including said second electrical means for producing potential representing turbine outlet temperature, an electrical system jointly responsive to said temperature potential and to the difference between derived potential from said first and second-named electrical means respectively for producing a resultant potential representing instant temperature response, and turbine outlet temperature indicating means responsive to said resultant potential whereby simulated acceleration temperature is represented at said indicating means in accordance with advance in throttle position.

7. Apparatus for simulating the operation of a turbo-jet engine for high-speed aircraft comprising a simulated throttle control, a plurality of voltage deriving means operable according to simulated flight conditions respectively including outside air temperature and Mach number, said deriving means adapted to combine derived voltages jointly to produce one or more voltages representing adiabatic temperature functions, voltage deriving means operable by said throttle control to represent turbine R. P. M., servo means responsive jointly to a voltage from the throttle deriving means and a temperature function voltage for representing equivalent R. P. M., and means responsive jointly to said servo means, the Mach number deriving means and at least one of said function voltages for controlling indicating means representing turbine outlet temperature.

8. Apparatus for simulating the operation of a turbo-jet engine for high-speed aircraft comprising a simulated throttle control, a plurality of voltage deriving means operable according to simulated flight conditions respectively including outside air temperature and Mach number, said deriving means adapted to combine derived voltages jointly to produce voltages representing adiabatic temperature functions, a voltage deriving means operable by said throttle control for controlling servo means representing turbine R. P. M., servo means responsive jointly to the R. P. M. servo means and a temperature function voltage for representing equivalent R. P. M., and means responsive jointly to the Mach number deriving means and equivalent R. P. M. servo means for controlling indicating means representing turbine outlet temperature.

9. Apparatus for simulating the operation of a turbojet engine for high-speed aircraft comprising a simulated throttle control, a plurality of voltage deriving means operable according to simulated flight conditions respectively including outside air temperature and Mach number adapted to combine derived voltages for jointly producing voltages representing functions of adiabatic temperature ratio, voltage deriving means operable by said throttle control for in turn controlling voltage deriving means representing turbine R. P. M., voltage deriving means representing equivalent R. P. M. in turn jointly responsive to the turbine R. P. M. means and one of said function voltages, and electrical means responsive jointly to the Mach number and equivalent R. P. M., deriving means and one of said function voltages for controlling indicating means representing turbine outlet temperature, said throttle and R. P. M. deriving means adapted jointly to modify the operation of said electrical means for simulating changes in said turbine outlet temperature due to acceleration and deceleration.

10. Apparatus for simulating the operation of a turbojet engine for high-speed aircraft comprising a simulated throttle control, a plurality of voltage deriving means operable according to simulated flight conditions respectively including outside air temperature and Mach number adapted to combine derived voltages for jointly producing voltages representing functions of adiabatic temperature ratio, voltage deriving means operable by said throttle control for in turn controlling servo operated voltage deriving means representing turbine R. P. M., servo operated voltage deriving means representing equivalent R. P. M. in turn jointly responsive to the R. P. M. servo means and one of said function voltages representing the square root of adiabatic temperature ratio, and electrical means responsive jointly to derived voltages from the Mach number and equivalent R. P. M. deriving means and another of said function voltages representing adiabatic temperature ratio for controlling indicating means representing turbine outlet temperature.

11. Apparatus for simulating the operation of a turbojet engine for high-speed aircraft comprising a simulated throttle control, a plurality of voltage deriving means operable according to simulated flight conditions respectively including altitude, outside air temperature and Mach number adapted to combine derived voltages for jointly producing voltages representing functions of relative pressure and adiabatic temperature ratio, voltage deriving means operable by said throttle control for in turn normally controlling voltage deriving means representing turbine R. P. M., means jointly responsive to voltages from said plurality of deriving means, the R. P. M. deriving means and at least one of said function voltages for representing fuel flow to the turbine, and means responsive thereto for transferring control of said R. P. M. means from said throttle means to said fuel flow means when said fuel flow is represented as less than that for "idle R. P. M."

12. Apparatus for simulating the operation of a turbojet engine for high-speed aircraft comprising a simulated throttle control, a plurality of voltage deriving means operable according to simulated flight conditions respectively including altitude, outside air temperature and Mach number adapted to combine derived voltages for jointly producing voltages representing functions of relative pressure and adiabetic temperature ratio, voltage deriving means operable by said throttle control for in turn normally controlling voltage deriving means representing and indicating turbine R. P. M., means jointly responsive to a constant voltage and a voltage representing fuel flow comprising the resultant of voltages from said plurality of deriving means, the R. P. M. deriving means and at least one of said function voltages for in turn producing a voltage representing a turbine fuel flow increment, discriminator means responsive to said increment voltage, and relay means responsive to said discriminator means for transferring control of said R. P. M. means from said throttle means to said fuel flow means when said fuel flow is represented as less than that for "idle R. P. M." for maintaining R. P. M. indication at "idle R. P. M."

13. Apparatus for simulating the operation of a turbojet engine for high-speed aircraft comprising a simulated throttle control, a plurality of servo operated voltage deriving means operable according to simulated flight conditions respectively including altitude, outside air temperature and Mach number adapted to combine derived voltages for jointly producing voltages representing functions of relative pressure and adiabatic temperature ratio, voltage deriving means operable by said throttle control for in turn normally controlling servo-controlled voltage deriving means representing turbine R. P. M., electrical means responsive to the joint operation of the altitude and Mach number servo means as modified by certain of at least one function voltages for producing a voltage representing the difference between fuel flow and "idle" fuel flow, means controlled by said fuel flow difference voltage for transferring the control of the R. P. M. servo means from said throttle means to said electrical means when the fuel flow is represented as less than that for "idle R. P. M.," and means responsive jointly to at least one of said function voltages and derived voltages from said Mach number and R. P. M. deriving means for controlling indicating means representing turbine outlet temperature.

14. Apparatus for simulating the operation of a turbojet engine for high-speed aircraft comprising a simulated throttle control, a plurality of servo operated voltage deriving means operable according to simulated flight conditions respectively including altitude, outside air temperature and Mach number adapted to combine derived voltages for jointly producing voltages representing functions of relative pressure and adiabatic temperature ratio, voltage deriving means operable by said throttle control for in turn normally controlling servo-controlled voltage deriving means representing turbine R. P. M., electrical means responsive to a constant voltage representing "idle R. P. M." fuel flow and a voltage produced by the joint operation of the altitude and Mach number servo means as modified by at least one of said function voltages for in turn producing a voltage representing the difference between fuel flow and "idle" fuel flow, and means including a grid-controlled discharge device controlled by said fuel flow difference voltage for transferring the control of the turbine R. P. M. servo means from said throttle means to said electrical means when the fuel flow is represented as less than that for "idle R. P. M." whereby the R. P. M. servo means represents the "idle" R. P. M.

15. Apparatus for simulating the operation of a turbojet engine for high-speed aircraft comprising a simulated throttle control, computing means operable according to simulated flight and engine conditions including means for producing voltages representing functions of relative pressure and adiabatic temperature ratio, means operable by said throttle control for in turn normally controlling means representing and indicating turbine R. P. M., fuel flow means jointly responsive to a constant voltage representing "idle" fuel flow and a voltage from said computing means representing total fuel flow for in turn producing a voltage representing an increment of turbine fuel flow, discriminator means responsive to said increment voltage for representing "idle R. P. M.," and relay means responsive to said discriminator means for transferring control of the turbine R. P. M. means from the throttle means to said fuel flow means when said fuel flow is represented as less than that for "idle R. P. M." for precluding decrease of R. P. M. indication below "idle R. P. M."

16. Apparatus for simulating the operation of a turbojet engine for high-speed aircraft comprising a simulated throttle control, means operable by said throttle control for in turn normally controlling servo-controlled voltage deriving means representing turbine R. P. M., electrical computing means including the R. P. M. servo means for producing a voltage in accordance with simulated flight and engine conditions for representing total fuel flow, electrical means responsive jointly to a constant voltage representing "idle R. P. M." fuel flow and the fuel flow voltage for in turn producing a voltage representing the difference between fuel flow and "idle" fuel flow, discriminator means controlled jointly by the fuel flow difference voltage, and transfer means responsive thereto for transferring the control of said R. P. M. servo means from the throttle means to said electrical means when the fuel flow is represented as less than that for "idle R. P. M." whereby the R. P. M. servo means is precluded from representing less than "idle" R. P. M.

17. Apparatus for simulating the operation of a turbojet engine for high-speed aircraft comprising a simulated throttle control, a plurality of servo means operable according to simulated flight conditions respectively including altitude, outside air temperature and Mach number for jointly producing voltages representing functions of relative pressure and adiabatic temperature ratio, voltage deriving means operable by said throttle control for in turn normally controlling servo-controlled voltage deriving means representing turbine R. P. M., electrical means responsive to a constant voltage representing idle R. P. M. fuel flow and a voltage representing total fuel flow produced by the joint operation of the altitude, R. P. M., and Mach number servo means as modified by at least one of said function voltages for in turn producing a voltage representing the difference between fuel flow and "idle" fuel flow, discriminator means controlled by the fuel flow difference voltage, and transfer means responsive thereto for transferring the control of the R. P. M. servo means from said throttle means to said electrical means when the fuel flow is represented as less than that for "idle R. P. M." whereby the R. P. M. servo means is operated by said difference voltage until said difference voltage is reduced to zero whereby said R. P. M. servo means is positioned to represent "idle R. P. M."

18. Apparatus for simulating the operation of a turbojet engine for high-speed aircraft comprising a simulated throttle control, computing means operable according to simulated flight and engine conditions including means for producing voltages representing functions of relative pressure and adiabatic temperature ratio, means operable by said throttle control for in turn normally controlling means representing and indicating turbine R. P. M., means jointly responsive to a constant voltage representing "idle" fuel flow and a voltage from said computing means representing total fuel flow for in turn producing a voltage representing a turbine fuel flow increment, discriminator means responsive jointly to said increment voltage and to transient condition voltages representing throttle position and turbine R. P. M. respectively, and relay means responsive to said discriminator means for transferring control of said R. P. M. means from said throttle means to said fuel flow means when said fuel flow is represented as less than that for "idle" R. P. M. for precluding decrease of R. P. M. indication below "idle R. P. M."

19. Apparatus for simulating the operation of a turbojet engine for high-speed aircraft comprising a simulated throttle control, means operable by said throttle control for in turn normally controlling servo-controlled voltage deriving means representing turbine R. P. M., electrical computing means including said R. P. M. servo means for producing a voltage in accordance with simulated flight and engine conditions for representing total fuel flow, electrical means responsive to a constant voltage representing idle R. P. M. fuel flow and said fuel flow voltage for in turn producing a voltage representing the difference between fuel flow and "idle" fuel flow, and means including a grid-controlled discriminator device controlled jointly by said fuel flow difference voltage and oppositely polarized transient condition voltages representing throttle position and turbine R. P. M. respectively for transferring the control of said R. P. M. servo means from said throttle means to said electrical means when the fuel flow is represented as less than that for "idle R. P. M." whereby the R. P. M. servo means is precluded from representing less than "idle" R. P. M., said R. P. M. servo means being responsive solely to said difference voltage for in turn controlling said computing means until the total fuel flow is represented as equal to idle fuel flow, thereby positioning said R. P. M. servo at "idle R. P. M."

20. Apparatus for simulating the operation of a turbojet engine for high-speed aircraft comprising a simulated throttle control, a plurality of servo-operated voltage deriving means operable according to simulated flight conditions respectively including altitude, outside air temperature and Mach number adapted to combine derived voltages for jointly producing voltages representing functions of relative pressure and adiabatic temperature ratio, voltage deriving means operable by said throttle control for in turn normally controlling servo-controlled voltage deriving means representing turbine R. P. M., electrical means responsive to a constant voltage representing idle R. P. M. fuel flow and a voltage representing total fuel flow produced by the joint operation of the altitude, R. P. M. and Mach number servo means as modified by at least one of said function voltages for in turn producing a voltage representing the difference between fuel flow and "idle" fuel flow, and means including grid-controlled discharge device controlled by said fuel flow difference voltage for transferring the control of said R. P. M. servo means from said throttle means to said electrical means when the fuel flow is represented as less than that for "idle R. P. M." whereby the R. P. M. servo means represents the "idle R. P. M."

21. Apparatus for simulating the operation of a turbojet engine for high speed aircraft comprising a simulated throttle control, means for representing simulated air speed of the aircraft, means for simulating turbine R. P. M., relay means operable between positions representing "fired" and "unfired" conditions of the turbine, said relay adapted to transfer control of said R. P. M. means from said throttle means to said air speed means when the relay is operated to the "unfired" position for representing "wind milling" R. P. M., and control means representing the turbine air doors for precluding operation of said R. P. M. means by said air speed means when the air doors are represented as closed, and vice versa.

22. Apparatus for simulating the operation of a turbojet engine for high speed aircraft comprising relay means operable between positions representing "fired" and "unfired" conditions of the turbine, computing means for deriving a control quantity according to simulated flight and engine conditions for representing turbine outlet temperature, means for producing a control quantity representing outside air temperature, and means responsive to either of said control quantities for indicating turbine outlet temperature, said relay means being adapted to transfer control of said indicating means from said computing means to said outside air temperature means when said relay means is "unfired," and vice versa.

23. Apparatus for simulating the operation of a turbojet engine for high speed aircraft comprising a simulated throttle control, means representing turbine R. P. M., means for representing turbine fuel flow responsive alternatively to said R. P. M. means or throttle means, indicating means responsive to said fuel flow means for representing a fuel gauge, and means operable to represent "fired" and "unfired" conditions of the turbine for transferring the control of said fuel flow means from said R. P. M. means to said throttle means when operated as "unfired" and vice versa.

24. Apparatus for simulating the operation of a turbojet engine for high speed aircraft comprising a simulated throttle control, means representing turbine R. P. M., means for representing turbine fuel flow responsive alternatively to said R. P. M. means or throttle means, indicating means responsive to said fuel flow means for representing a fuel gauge, relay means operable between positions representing "fired" and "unfired" conditions of the turbine for transferring the control of said fuel flow means from said R. P. M. means to said throttle means when said relay is operated as "unfired" and vice versa, and additional relay means operable between positions representing "open" and "closed" air doors for precluding operation of said fuel flow means by said throttle means in the "air doors closed" position.

25. Apparatus for simulating the operation of a turbojet engine for high speed aircraft comprising a simulated throttle control, control quantity deriving means operable thereby, a plurality of additional control quantity deriving means operable respectively according to functions of various simulated atmospheric and flight conditions including Mach number, said additional deriving means adapted to combine respective control quantities jointly to produce a control quantity representing a pressure-temperature function corresponding to $\delta_2\sqrt{\theta_2}$ is a relative pressure ratio factor and $\theta_2$ is an adiabatic temperature ratio, and means associated with said flight condition and throttle deriving means adapted to modify said pressure-temperature control quantity for representing turbine fuel flow.

26. Apparatus for simulating the operation of a turbojet engine for high speed aircraft comprising a plurality of control quantity deriving means operable respectively according to functions of various simulated atmospheric and flight conditions including Mach number, said flight condition deriving means adapted to combine respective control quantities jointly to produce a control quantity representing a pressure-temperature function corresponding to $\delta_2\sqrt{\theta_2}$ where $\delta_2$ is a relative pressure ratio factor and $\theta_2$ is an adiabatic temperature ratio, deriving means representing engine R. P. M., and means associated with certain of said flight and engine deriving means for modifying said pressure-temperature control quantity for representing turbine fuel flow.

27. Apparatus for simulating the operation of a turbojet engine for high speed aircraft comprising a plurality of control quantity deriving means operable respectively according to functions of various simulated flight conditions and engine R. P. M., certain of said flight condition deriving means adapted to combine respective control quantities jointly to produce a plurality of control quantities including a quantity representing a pressure-temperature function corresponding to $\delta_2\sqrt{\theta_2}$ where $\delta_2$ is a relative pressure ratio factor and $\theta_2$ is an adiabatic temperature ratio, and a quantity corresponding to $\sqrt{\theta_2}$, and servo means responsive jointly to said $\sqrt{\theta_2}$ quantity and a quantity corresponding to engine R. P. M. (N) for representing a control factor $N/\sqrt{\theta_2}$, said pressure-temperature control quantity being modified by said control factor servo and by certain of said flight condition deriving means for representing turbine fuel flow.

28. Apparatus for simulating the operation of a turbojet engine for high speed aircraft comprising a plurality of control quantity deriving means operable respectively according to functions of various simulated flight conditions including altitude, air temperature and Mach number, said deriving means adapted to combine respective control quantities jointly to produce control quantities including a quantity representing a pressure-temperature function corresponding to $\delta_2\sqrt{\theta_2}$ where $\delta_2$ is a relative pressure ratio factor and $\theta_2$ is an adiabatic temperature ratio, and a quantity corresponding to $\sqrt{\theta_2}$, means for deriving a control quantity corresponding to engine R. P. M. (N), means representing "equivalent R. P. M." responsive jointly to said $\sqrt{\theta_2}$ and N quantities for representing a control factor $N/\sqrt{\theta_2}$, said pressure-temperature quantity being modified by said altitude, Mach number and control factor means for producing a resultant control quantity representing turbine fuel flow.

29. Apparatus for simulating the operation of a turbojet engine for high speed aircraft comprising control quantity deriving means operable respectively according to functions of simulated air temperature and Mach number, said deriving means adapted to combine respective control quantities jointly to produce in turn control quantities representing temperature functions corresponding to $\theta_2$ and $\sqrt{\theta_2}$, where $\theta_2$ is an adiabatic temperature ratio, means for deriving a control quantity representing engine R. P. M. (N), means responsive jointly to the N and $\sqrt{\theta_2}$ control quantities for producing a control quantity representing "equivalent R. P. M." $N/\sqrt{\theta_2}$, and means for combining with said equivalent R. P. M. control quantity other control quantities representing Mach number and $\theta_2$ for producing a resultant control quantity representing turbine outlet temperature, and indicating means responsive to said resultant quantity.

30. Apparatus for simulating the operation of a turbojet engine for high speed aircraft comprising control quantity deriving servo means operable respectively according to functions of simulated air temperature and Mach number, said servo means adapted to combine respective control quantities jointly to produce in turn control quantities representing temperature functions of an adiabatic temperature ratio, means for deriving a control quantity representing engine R. P. M. (N), servo means responsive jointly to said R. P. M. control quantity and one of said temperature function control quantities for producing a control quantity representing "equivalent R. P. M." and servo means for combining with said equivalent R. P. M. control quantity other control quantities representing Mach number and another temperature function for producing a resultant control quantity representing turbine outlet temperature, and indicating means responsive to said resultant quantity.

31. Apparatus for simulating the operation of a turbojet engine for high speed aircraft comprising a simulated throttle control and means responsive thereto for deriving a control voltage, a servo system representing engine R. P. M. responsive to said control voltage, computing means operable according to simulated flight and engine conditions including simulated idle fuel flow for producing a resultant voltage representing a fuel flow increment, discriminator means responsive to said increment voltage the output of which is variable in sense according to the relationship between computed fuel flow and simulated idle fuel flow, and relay means responsive to the discriminator output for transferring the control of said R. P. M. servo from the throttle control voltage to the increment voltage when computed fuel flow equals idle fuel flow.

32. Apparatus for simulating the operation of a turbojet engine for high speed aircraft comprising a simulated throttle control and means responsive thereto for deriving a control voltage, a servo system representing engine R. P. M. responsive to said control voltage, computing means operable according to simulated flight and engine conditions including simulated idle fuel flow for producing a resultant voltage representing a fuel flow increment, discriminator means responsive jointly to said increment voltage and to a pair of voltages of opposite sense derived by said throttle control and R. P. M. servo system respectively, the output of said discriminator means being variable in sense normally according to the value of the computed increment voltage and during rapid deceleration to the instantaneous position of the throttle control, and relay means responsive to said discriminator means for transferring the control of said R. P. M. servo from the throttle control voltage to the increment voltage according to the sense of the discriminator output.

33. Apparatus for simulating the operation of a turbojet engine for high speed aircraft comprising a simulated throttle control, means responsive thereto for deriving a control voltage, a servo system representing engine R. P. M. responsive to said control voltage, computing means operable in accordance with simulated flight conditions for producing a control voltage representing a temperature function, a servo system representing an "equivalent R. P. M." computing factor responsive jointly to said temperature function voltage and the operation of said R. P. M. servo, said equivalent R. P. M. servo being adapted to compute, in combination with other voltages from said computing means representing flight conditions and pressure-temperature functions, a voltage representing turbine fuel flow, summing means jointly responsive to said computed voltage and a constant voltage representing "idle fuel flow" for producing a resultant voltage representing fuel flow increment, and means controlled by said increment voltage for transferring the control of said R. P. M. servo from said throttle control to said summing means upon decrease of said computed fuel flow voltage to a value equal to the idle fuel flow voltage, thereby representing "idle R. P. M."

34. Apparatus for simulating the operation of a turbojet engine for high speed aircraft comprising a simulated throttle control, means responsive thereto for deriving a control voltage, a servo system including indicating means representing engine R. P. M. responsive to said control voltage, computing means operable in accordance with simulated flight conditions for producing a control voltage representing a temperature function, a servo system representing an "equivalent R. P. M." computing factor responsive jointly to said temperature function voltage and the operation of said R. P. M. servo, said equivalent R. P. M. servo being adapted to compute, in combination with said computing means, a voltage representing turbine fuel flow, summing means jointly responsive to said computed voltage and a constant voltage representing idle fuel flow for producing a resultant voltage representing a fuel flow increment, and means controlled by said increment voltage for transferring the control of said R. P. M. servo from said throttle control to said summing means to represent "idle R. P. M.," said transfer means also being subject to rapid change in throttle position representing deceleration for transferring control of the R. P. M. servo to said summing means.

35. Apparatus for simulating the operation of a turbojet engine for high speed aircraft comprising a simulated throttle control, means responsive thereto for deriving a control voltage, a servo system representing engine R. P. M. responsive to said voltage, computing means operable according to simulated flight conditions and engine R. P. M. for producing a voltage representing turbine outlet temperature, indicating means jointly responsive to said temperature voltage and to a first pair of voltages opposite in sense to each other produced respectively according to throttle position and engine R. P. M., said computing means also adapted to produce a voltage representing the difference between computed fuel flow and idle fuel flow, and discriminator means responsive jointly to said difference voltage and a second pair of oppositely-sensed voltages also representing throttle position and engine R. P. M., said discriminator being operable in accordance with rapid change in the throttle voltage representing deceleration to cause disconnection of said first pair of voltages at said temperature indicating means for maintaining realistic indication of turbine outlet temperature during rapid decelerating movement of the throttle control.

36. Apparatus for simulating the operation of a turbojet engine for high speed aircraft comprising a simulated throttle control operable by the pilot, deriving means responsive to operation of said throttle control for producing potential representing a function of turbine R. P. M., means operable according to simulated Mach number and ambient atmospheric conditions for producing potential representing functions of $\theta_2$ (where $\theta_2$ represents an adiabatic temperature ratio incident to relative motion of the air and airplane), an electric servo system representing an operator $N/\sqrt{\theta_2}$ (where N represents actual turbine R. P. M.) controlled according to the R. P. M. and $\theta_2$ function potentials, and an electrical system responsive to computing means including said $N/\sqrt{\theta_2}$ servo for indicating turbine outlet temperature.

37. Apparatus for simulating temperature characteristics of a turbine-type engine for high speed aircraft comprising a simulated throttle control operable by the pilot, electrical means responsive to operation of said throttle control for producing control potential representing a function of turbine R. P. M., means operable according to simulated flight and ambient atmospheric conditions for producing potential representing functions of $\theta_2$ (where $\theta_2$ is an adiabatic temperature ratio incident to relative motion of the air and airplane), an electrical computing system controlled according to the R. P. M. and $\theta_2$ function potentials including an electric servo system representing an operator $N/\sqrt{\theta_2}$ (where N represents turbine R. P. M.), and an electrical system responsive to said computing means including the $N/\sqrt{\theta_2}$ servo system for indicating turbine outlet temperature.

38. Apparatus for simulating fuel flow characteristics of a turbo-jet engine for high speed aircraft comprising a simulated throttle control operable by the pilot, electrical means responsive to operation of said throttle control for producing control potential representing a function of turbine R. P. M., means operable according to simulated Mach number and ambient atmospheric conditions for producing potential representing functions of $\delta_2$ and $\theta_2$ (where $\delta_2$ is the relative pressure ratio of ram to ambient pressures and $\theta_2$ is an adiabatic temperature ratio incident to relative motion of the air and airplane), and an electrical computing system controlled according to the R. P. M., $\delta_2$ and $\theta_2$ function potentials including an electric servo system representing an operator $N/\sqrt{\theta_2}$ (where N represents turbine R. P. M.) for computing turbine fuel flow.

39. Apparatus for simulating fuel flow characteristics of a turbo-jet engine for high speed aircraft comprising a simulated throttle control operable by the pilot, electrical means responsive to operation of said throttle control for producing control potential representing a function of turbine R. P. M., means operable according to simulated Mach number and ambient atmospheric conditions for producing potential representing functions of $\delta_2$ and $\theta_2$ (where $\delta_2$ is the relative pressure ratio of ram to ambient pressures and $\theta_2$ is an adiabatic temperature ratio incident to relative motion of the air and airplane) including a pressure-temperature function $\delta_2\sqrt{\theta_2}$, and an electrical computing system controlled according to the aforesaid R. P. M. and function potentials including an electric servo system representing an operator $N/\sqrt{\theta_2}$ (where N represents turbine R. P. M.), said $N/\sqrt{\theta_2}$ servo system being adapted to produce potential representing turbine fuel flow.

40. Apparatus for simulating fuel flow characteristics of a turbo-jet engine for high speed aircraft comprising a simulated throttle control operable by the pilot, electrical means responsive to operation of said throttle control for producing control potential representing a function of turbine R. P. M., means operable according to simulated Mach number and ambient atmospheric conditions for producing potential representing functions of $\delta_2$ and $\theta_2$ (where $\delta_2$ is the relative pressure ratio of ram to ambient pressures and $\theta_2$ is an adiabatic temperature ratio incident to relative motion of the air and airplane), including a pressure-temperature function $\delta_2\sqrt{\theta_2}$, and an electrical computing system controlled according to the R. P. M. and function potentials including an electric servo system representing an operator $N/\sqrt{\theta_2}$ (where N represents turbine R. P. M.), said $N/\sqrt{\theta_2}$ servo system having means energized according to said $\delta_2\sqrt{\theta_2}$ function potential for producing potential representing turbine fuel flow.

41. Apparatus for simulating the fuel flow characteristics of a turbo-jet engine for high speed aircraft comprising a plurality of control quantity deriving means operable respectively according to functions of various simulated atmospheric and flight conditions for combining derived control quantities jointly to produce a control quantity representing a pressure-temperature function corresponding to $\delta_2\sqrt{\theta_2}$, where $\delta_2$ is a relative pressure ratio factor and $\theta_2$ is an adiabatic temperature ratio incident to the simulated flight means, for producing a control quantity representing a function of turbine R. P. M., and means for combining said pressure-temperature function quantity $\delta_2\sqrt{\theta_2}$ and said turbine R. P. M. quantity for representing turbine fuel flow.

42. Apparatus for simulating the operation of a turbo-jet engine for high speed aircraft comprising a simulated throttle control operable by the pilot, electrical means responsive to operation of said throttle control for producing control potential, means operable according to simulated flight and ambient atmospheric conditions for producing potential representing functions of $\delta_2$ and $\theta_2$ including a pressure-temperature function $\delta_2\sqrt{\theta_2}$ (where $\delta_2$ is the relative pressure pressure ratio of ram to ambient pressures and $\theta_2$ is an adiabatic temperature ratio incident to relative motion of the air and airplane), and an electrical computing system including a plurality of connected servo systems for combining said control and function potentials for computing turbine fuel flow and turbine outlet temperature.

43. Apparatus for simulating the operation of a turbo-jet engine for high speed aircraft comprising a simulated throttle control operable by the pilot, electrical means responsive to operation of said throttle control for producing control potential representing a function of turbine R. P. M., means operable according to simulated flight and ambient atmospheric conditions for producing potential representing functions of $\delta_2$ and $\theta_2$ including a pressure-temperature function $\delta_2\sqrt{\theta_2}$ (where $\delta_2$ is the relative pressure ratio of ram to ambient pressures and $\theta_2$ is an adiabatic temperature ratio incident to relative motion of the air and airplane), and an electrical computing system including a plurality of connected servo systems for combining said control and function potentials including a servo system that is operated to represent $N/\sqrt{\theta_2}$ (where N is turbine R. P. M.) for computing respectively turbine fuel flow and turbine outlet temperature.

44. Apparatus for simulating the operation of a turbo-jet engine for high speed aircraft comprising a simulated throttle control and means responsive thereto for deriving a control quantity representing a function of turbine R. P. M., a plurality of electrical systems operable respectively according to functions of simulated altitude and Mach number for jointly producing control quantities representing adiabatic temperature functions including a pressure-temperature function, and computing means including a servo system representing the factor $N/\sqrt{\theta_2}$ (where N represents turbine R. P. M. and $\theta_2$ is an adiabatic temperature ratio incident to relative motion of the air and airplane) operable according to R. P. M. and adiabatic temperature control quantities for combining said R. P. M. function quantity and said adiabatic temperature function quantities including a pressure-temperature function quantity to produce a resultant control quantity, and indicating means responsive to said resultant control quantity for representing fuel consumption.

References Cited in the file of this patent

UNITED STATES PATENTS

| | | |
|---|---|---|
| 2,487,758 | Kail | Nov. 8, 1949 |
| 2,506,946 | Burelbach et al. | May 9, 1950 |
| 2,564,429 | Germanton | Aug. 14, 1951 |

OTHER REFERENCES

Aviation, pages 128, 129, September 1944.

Aviation Week, pages 32–34; January 23, 1950.

Aero Digest, pages 36, 37, 99, 100; February 1950.

UNITED STATES PATENT OFFICE

Certificate of Correction

Patent No. 2,798,308 July 9, 1957

Robert G. Stern et al.

It is hereby certified that error appears in the printed specification of the above numbered patent requiring correction and that the said Letters Patent should read as corrected below.

Column 5, line 64, after "characteristics" insert a period; column 17, line 34, before "is" insert —where $\delta_2$—; column 21, line 38, strike out "pressure", second occurrence.

Signed and sealed this 24th day of September 1957.

[SEAL]

Attest:
KARL H. AXLINE,
*Attesting Officer.*

ROBERT C. WATSON,
*Commissioner of Patents.*